(12) United States Patent
Magai et al.

(10) Patent No.: US 8,406,455 B2
(45) Date of Patent: Mar. 26, 2013

(54) DIGITAL WATERMARK EMBEDDING DEVICE AND DIGITAL WATERMARK DETECTING DEVICE

(75) Inventors: Koichi Magai, Tokyo (JP); Hiroshi Ito, Tokyo (JP); Ryousuke Fujii, Tokyo (JP); Mitsuyoshi Suzuki, Tokyo (JP); Kohtaro Asai, Tokyo (JP); Tokumichi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1177 days.

(21) Appl. No.: 12/066,837

(22) PCT Filed: Sep. 27, 2006

(86) PCT No.: PCT/JP2006/319140
§ 371 (c)(1),
(2), (4) Date: Mar. 14, 2008

(87) PCT Pub. No.: WO2007/040112
PCT Pub. Date: Apr. 12, 2007

(65) Prior Publication Data
US 2009/0285442 A1 Nov. 19, 2009

(30) Foreign Application Priority Data
Oct. 3, 2005 (JP) ................. 2005-289869

(51) Int. Cl.
*G06K 9/00* (2006.01)
*H04N 1/40* (2006.01)
(52) U.S. Cl. ...................... 382/100; 358/3.28
(58) Field of Classification Search .................. 382/100, 382/232
See application file for complete search history.

(56) References Cited

U.S. PATENT DOCUMENTS
(Continued)

FOREIGN PATENT DOCUMENTS
JP 2001-24877 1/2001
JP 2004-56224 2/2004
(Continued)

OTHER PUBLICATIONS
W. Bender et al., "Techniques for Data Hiding", IBM Systems Journal, vol. 35, No. 3&4, pp. 313-336, 1996.

*Primary Examiner* — Claire X Wang
*Assistant Examiner* — Avinash J Yentrapati
(74) *Attorney, Agent, or Firm* — Oblon, Spivak, McClelland, Maier & Neustadt, L.L.P.

(57) ABSTRACT

A digital watermark embedding device and a digital watermark detecting device are obtained, which can realize stable digital watermark detection using fewer, and embed and detect a larger amount of digital watermark information with an identical number of pixels used for digital watermark embedding in a conventional technology. The digital watermark embedding device includes: an embedding-information converting unit (103) for converting inputted information to be embedded into a bit string formed of "0's" and "1's" and embedding respective bits of the converted bit string multiple times to output a digital watermark pattern having N −1's or N+1's as elements; an orthogonal-pattern generating unit (105) for generating orthogonal patterns each formed of a combination of elements of −1's and +1's and orthogonal to one another; an integrating unit (109) for integrating each of the orthogonal patterns from the orthogonal-pattern generating unit with each of the elements of the digital watermark pattern from the embedding-information converting unit to generate an embedding pattern; and a digital-watermark embedding unit (107) for embedding embedding pattern from the integrating unit in an input image and outputting an image after embedding information.

2 Claims, 7 Drawing Sheets

U.S. PATENT DOCUMENTS

| | | | |
|---|---|---|---|
| 6,510,233 B1 * | 1/2003 | Nakano | 382/100 |
| 6,721,437 B1 * | 4/2004 | Ezaki et al. | 382/100 |
| 6,785,401 B2 * | 8/2004 | Walker et al. | 382/100 |
| 7,496,209 B2 * | 2/2009 | Lu et al. | 382/100 |
| 2002/0001394 A1 * | 1/2002 | Taniguchi et al. | 382/100 |
| 2004/0076222 A1 * | 4/2004 | De Francesco et al. | 375/141 |
| 2005/0025337 A1 * | 2/2005 | Lu et al. | 382/100 |
| 2005/0180386 A1 * | 8/2005 | Hansen et al. | 370/350 |
| 2006/0188128 A1 * | 8/2006 | Rhoads | 382/100 |
| 2006/0251291 A1 * | 11/2006 | Rhoads | 382/100 |
| 2007/0263214 A1 * | 11/2007 | Fateley et al. | 356/332 |
| 2008/0137905 A1 * | 6/2008 | Madrange | 382/100 |

FOREIGN PATENT DOCUMENTS

| | | |
|---|---|---|
| JP | 2004 56224 | 2/2004 |
| JP | 2005-51785 | 2/2005 |
| JP | 2005 51785 | 2/2005 |
| WO | WO 2009080844 A1 * | 7/2009 |

* cited by examiner

FIG. 5

500 ORTHOGONAL PATTERN    510 BIT REPRESENTATION

| | | | | | | |
|---|---|---|---|---|---|---|
| 501 | +1 | +1 | +1 | +1 | "000" | 511 |
| 502 | +1 | +1 | -1 | -1 | "001" | 512 |
| 503 | +1 | -1 | +1 | -1 | "010" | 513 |
| 504 | +1 | -1 | -1 | +1 | "011" | 514 |

520 ORTHOGONAL PATTERN (WITH SIGNS INVERTED)    530 BIT REPRESENTATION

| | | | | | | |
|---|---|---|---|---|---|---|
| 521 | -1 | -1 | -1 | -1 | "111" | 531 |
| 522 | -1 | -1 | +1 | +1 | "110" | 532 |
| 523 | -1 | +1 | -1 | +1 | "101" | 533 |
| 524 | -1 | +1 | +1 | -1 | "100" | 534 |

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 7

| | | | | | | | | |
|---|---|---|---|---|---|---|---|---|
| 0 | 1 | 2 | 3 | 4 | 5 | 6 | (7) | 701 |
| 8 | 9 | 10 | 11 | 12 | 13 | 14 | (15) | 702 |
| 16 | 17 | 18 | 19 | 20 | 21 | 22 | (23) | 703 |
| 24 | 25 | 26 | 27 | 28 | 29 | 30 | (31) | 704 |
| 32 | 33 | 34 | 35 | 36 | 37 | 38 | (39) | 705 |
| 40 | 41 | 42 | 43 | 44 | 45 | 46 | (47) | 706 |
| 48 | 49 | 50 | 51 | 52 | 53 | 54 | (55) | 707 |
| 56 | 57 | 58 | 59 | 60 | 61 | 62 | (63) | 708 |

| | | | | | | | | |
|---|---|---|---|---|---|---|---|---|
| 0 | 1 | 2 | 3 | 4 | 5 | 6 | (7) | 801 |
| 8 | 9 | 10 | 11 | 12 | 13 | 14 | 15 | |
| 16 | 17 | 18 | 19 | 20 | 21 | 22 | (23) | 802 |
| 24 | 25 | 26 | 27 | 28 | 29 | 30 | 31 | |
| 32 | 33 | 34 | 35 | 36 | 37 | 38 | (39) | 803 |
| 40 | 41 | 42 | 43 | 44 | 45 | 46 | 47 | |
| 48 | 49 | 50 | 51 | 52 | 53 | 54 | (55) | 804 |
| 56 | 57 | 58 | 59 | 60 | 61 | 62 | 63 | |

| 0 | 1 | 2 | 3 | 4 | 5 | 6 | ⑦ | 901 |
|---|---|---|---|---|---|---|---|---|
| 8 | 9 | 10 | 11 | 12 | 13 | 14 | 15 | |
| 16 | 17 | 18 | 19 | 20 | 21 | 22 | 23 | |
| 24 | 25 | 26 | 27 | 28 | 29 | 30 | 31 | |
| 32 | 33 | 34 | 35 | 36 | 37 | 38 | ㊴ | 902 |
| 40 | 41 | 42 | 43 | 44 | 45 | 46 | 47 | |
| 48 | 49 | 50 | 51 | 52 | 53 | 54 | 55 | |
| 56 | 57 | 58 | 59 | 60 | 61 | 62 | 63 | |

| 0 | 1 | 2 | 3 | 4 | 5 | 6 | ⑦ | 1001 |
|---|---|---|---|---|---|---|---|---|
| 8 | 9 | 10 | 11 | 12 | 13 | 14 | 15 | |
| 16 | 17 | 18 | 19 | 20 | 21 | 22 | 23 | |
| 24 | 25 | 26 | 27 | 28 | 29 | 30 | 31 | |
| 32 | 33 | 34 | 35 | 36 | 37 | 38 | 39 | |
| 40 | 41 | 42 | 43 | 44 | 45 | 46 | 47 | |
| 48 | 49 | 50 | 51 | 52 | 53 | 54 | 55 | |
| 56 | 57 | 58 | 59 | 60 | 61 | 62 | 63 | |

FIG. 11

| | 1100<br>ORTHOGONAL<br>PATTERN | | | | 1110<br>BIT<br>REPRESENTATION |
|---|---|---|---|---|---|
| 1101 | +1 | +1 | +1 | +1 | 1111 "1" AT THE TIME OF EMBEDDING 8 BITS |
| 1102 | +1 | +1 | −1 | −1 | 1112 "1" AT THE TIME OF EMBEDDING 16 BITS |
| 1103 | +1 | −1 | +1 | −1 | 1113 "1" AT THE TIME OF EMBEDDING 32 BITS |
| 1104 | +1 | −1 | −1 | +1 | 1114 "1" AT THE TIME OF EMBEDDING 64 BITS |

| | 1120<br>ORTHOGONAL PATTERN<br>(WITH SIGNS INVERTED) | | | | 1130<br>BIT<br>REPRESENTATION |
|---|---|---|---|---|---|
| 1121 | −1 | −1 | −1 | −1 | 1131 "0" AT THE TIME OF EMBEDDING 8 BITS |
| 1122 | −1 | −1 | +1 | +1 | 1132 "0" AT THE TIME OF EMBEDDING 16 BITS |
| 1123 | −1 | +1 | −1 | +1 | 1133 "0" AT THE TIME OF EMBEDDING 32 BITS |
| 1124 | −1 | +1 | +1 | −1 | 1134 "0" AT THE TIME OF EMBEDDING 64 BITS |

DIGITAL WATERMARK EMBEDDING DEVICE AND DIGITAL WATERMARK DETECTING DEVICE

TECHNICAL FIELD

The present invention relates to a digital watermark embedding device and a digital watermark detecting device for improving detection accuracy for a digital watermark.

BACKGROUND ART

As a conventional technology for embedding and detecting watermark information, there is a method of embedding information making use of the fact that, on condition that pixel values are distributed at random, a sum of differences converges to 0 when two points are selected spatially at random and a difference between the two points is calculated (see, for example, Non-Patent Document 1).

Non Patent Document 1: W. Bender et. al, "Techniques for data hiding", IBM systems journal, vol. 35, no. 3-4, pp. 313-336, 1996.

DISCLOSURE OF THE INVENTION

Problems to be solved by the Invention

However, in the conventional watermark information embedding technology described above, it is assumed that pixel values are distributed at random. However, depending on an image, since pixel values are not always distributed at random, a large number of pixels are necessary in order to cause a sum of differences to converge to 0. In other words, it has been necessary to perform calculation for a large number of pixels or it has been necessary to reduce an amount of information to be embedded in order to correctly detect information stably.

Further, in the conventional watermark information embedding technology described above, it has been necessary to know the number of bits embedded in advance at the time of digital watermark detection.

The present invention has been devised in order to solve the problems described above and it is an object of the present invention to obtain a digital watermark embedding device and a digital watermark detecting device that can embed a digital watermark as orthogonal patterns, realize stable digital watermark detection using pixels smaller in number than those in the conventional technology, and make it possible to embed and detect a larger digital watermark information amount with an identical number of pixels used for digital watermark embedding in the conventional technology.

Means for solving the Problems

A digital watermark embedding device according to the present invention includes: an embedding-information converting unit for converting inputted information to be embedded into a bit string formed of "0's" and "1's" and embedding respective bits of the converted bit string multiple times to output a digital watermark pattern having N−1's or N+1's as elements; an orthogonal-pattern generating unit for generating orthogonal patterns each formed of a combination of elements of −1's and +1's and orthogonal to one another; an integrating unit for integrating each of the orthogonal patterns from the orthogonal-pattern generating unit with each of the elements of the digital watermark pattern from the embedding-information converting unit to generate an embedding pattern; and a digital-watermark embedding unit for embedding pattern from the integrating unit in an input image and outputting an image after embedding information.

Further, a digital watermark detecting device according to the present invention includes: a digital-watermark extracting unit for extracting a pattern embedded as a digital watermark from an input image after embedding information, which is a digital watermark information detection target; an orthogonal-diffusion-pattern generating unit for generating a plurality of orthogonal patterns having the same length as that at the time of embedding; an integrating unit for integrating each of the plurality of orthogonal patterns generated by the orthogonal-diffusion-pattern generating unit and the extracted pattern from the digital-watermark extracting unit; a digital-watermark detecting unit for calculating detected values by calculating an average of values repeatedly embedded for each bit from a result of the integration of the integrating unit, extracting, concerning the calculated detected values, a detected value, an absolute value of which takes a maximum value, for each bit, and generating a digital watermark pattern; and a detected-information converting unit for converting the digital watermark pattern from the digital-watermark detecting unit into bit information, and converting a bit string of the bit information into detected information in accordance with rules set in advance.

Further, a digital watermark embedding device according to the present invention includes: an orthogonal-pattern generating unit for generating orthogonal patterns having a pattern length set in advance; an embedding-information converting unit for registering the orthogonal patterns from the orthogonal-pattern generating unit, carrying out association of the registered orthogonal patterns and specific bit representations, converting inputted information to be embedded into a bit string formed of "0's" and "1's", converting for each specific bit representation of the bit string into orthogonal patterns in accordance with the association of the bit representations and the orthogonal patterns, and repeatedly arranging the respective orthogonal patterns a number of times set in advance to generate an embedding pattern, and outputting the embedding pattern; and a digital-watermark embedding unit for embedding the embedding pattern from the embedding-information converting unit in an input image, generating an image after embedding information, and outputting the image after embedding information.

Further, a digital watermark detecting device according to the present invention includes: a digital-watermark extracting unit for extracting a pattern embedded as a digital watermark from an input image after embedding information, which is a digital watermark information detection target; an orthogonal-diffusion-pattern generating unit for generating a plurality of orthogonal patterns having the same length as that at the time of embedding; an integrating unit for integrating each of the plurality of orthogonal patterns generated by the orthogonal-diffusion-pattern generating unit and the extracted pattern from the digital-watermark extracting unit; a digital-watermark detecting unit for finding out an orthogonal pattern having a maximum value in a result of the integration of the integrating unit and generating a digital watermark pattern by selecting a bit string associated with the orthogonal pattern; and a detected-information converting unit for converting the digital watermark pattern from the digital-watermark detecting unit into bit information, converting a bit string of the bit information into detected information in accordance with rules set in advance, and outputting the detected information.

Further, a digital watermark embedding device according to the present invention includes: an orthogonal-pattern generating unit for generating orthogonal patterns each formed of a combination of elements of −1's and +1's and orthogonal to one another; an embedding-information converting unit for converting an inputted information to be embedded into a bit string formed of "0's" and "1's", replacing the bit string using the orthogonal patterns from the orthogonal-pattern generating unit, and generating an embedding pattern; and a digital-watermark embedding unit for embedding the embedding pattern from the embedding-pattern generating unit in an input image and outputting an image after embedding information.

Still further, a digital watermark detecting device according to the present invention includes: a digital-watermark extracting unit for extracting a pattern embedded as a digital watermark from an input image after embedding information, which is a digital watermark information detection target; an orthogonal-diffusion-pattern generating unit for generating a plurality of orthogonal patterns having the same length as that at the time of embedding; an integrating unit for integrating each of the plurality of orthogonal patterns generated by the orthogonal-diffusion-pattern generating unit and the extracted pattern from the digital-watermark extracting unit; a digital-watermark detecting unit for finding out an orthogonal pattern having a maximum value in a result of the integration of the integrating unit and generating a digital watermark pattern by selecting a bit string associated with the orthogonal pattern; and a detected-information converting unit for converting the digital watermark pattern from the digital-watermark detecting unit into bit information, converting a bit string of the bit information into detected information in accordance with rules set in advance, and outputting the detected information.

Effects of the Invention

According to the present invention, it is possible to embed a digital watermark as orthogonal patterns, realize stable digital watermark detection using pixels smaller in number than those in the conventional technology, and make it possible to embed and detect a larger digital watermark information amount with an identical number of pixels used for digital watermark embedding in the conventional technology.

BRIEF DESCRIPTION OF THE DRAWINGS

FIG. 5 is a diagram for explaining association of registered orthogonal patterns and specific bit representations in an information converting unit 303 of the digital watermark detecting device according to the second embodiment of the present invention and showing an example at the time when a pattern length is 4.

FIG. 6 is a diagram concerning a third embodiment of the present invention and for explaining judgment of the number of embedded bits.

FIG. 7 is a diagram concerning the third embodiment of the present invention and showing embedded blocks of a seventh bit at the time when 8 bits are embedded.

FIG. 8 is a diagram concerning the third embodiment of the present invention and showing embedded blocks of a seventh bit at the time when 16 bits are embedded.

FIG. 9 is a diagram concerning the third embodiment of the present invention and showing embedded blocks of a seventh bit at the time when 32 bits are embedded.

FIG. 10 is a diagram concerning the third embodiment of the present invention and showing embedded blocks of a seventh bit at the time when 64 bits are embedded.

FIG. 11 is a diagram concerning the third embodiment of the present invention and showing a digital watermark pattern for making it possible to judge the number of bits of an embedded digital watermark at the time of detection of a digital watermark.

BEST MODE FOR CARRYING OUT THE INVENTION

First Embodiment

Figure 1:
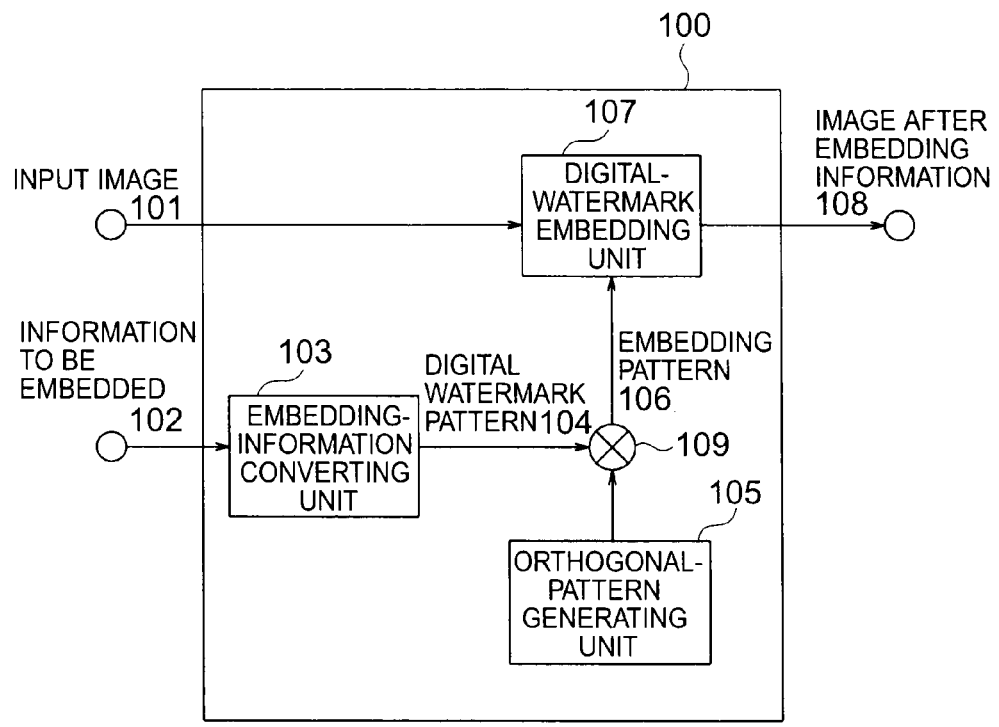
FIG. 1 is a block diagram showing the structure of a digital watermark embedding device according to a first embodiment of the present invention.

FIG. 1 is a block diagram showing the structure of a digital watermark embedding device according to a first embodiment of the present invention.

A digital watermark embedding device 100 according to the first embodiment shown in FIG. 1 includes an embedding-information converting unit 103 that converts inputted information to be embedded 102 into a bit string formed by "0's" and "1's" and outputs the converted bit string as a digital watermark pattern 104, an orthogonal-pattern generating unit 105 that outputs one of patterns formed by a combination of elements of −1's and +1's and orthogonal to one another (orthogonal patterns), an integrating unit 109 that integrates the orthogonal pattern outputted from the orthogonal-pattern generating unit 105 with respective elements of the digital watermark pattern 104 outputted from the embedding-information converting unit 103 to generate an embedding pattern 106, and a digital-watermark embedding unit 107 that embeds the embedding pattern 106 generated from the integrating unit 109 in an input image 101 and outputs an image after embedding information 108.

Figure 2:
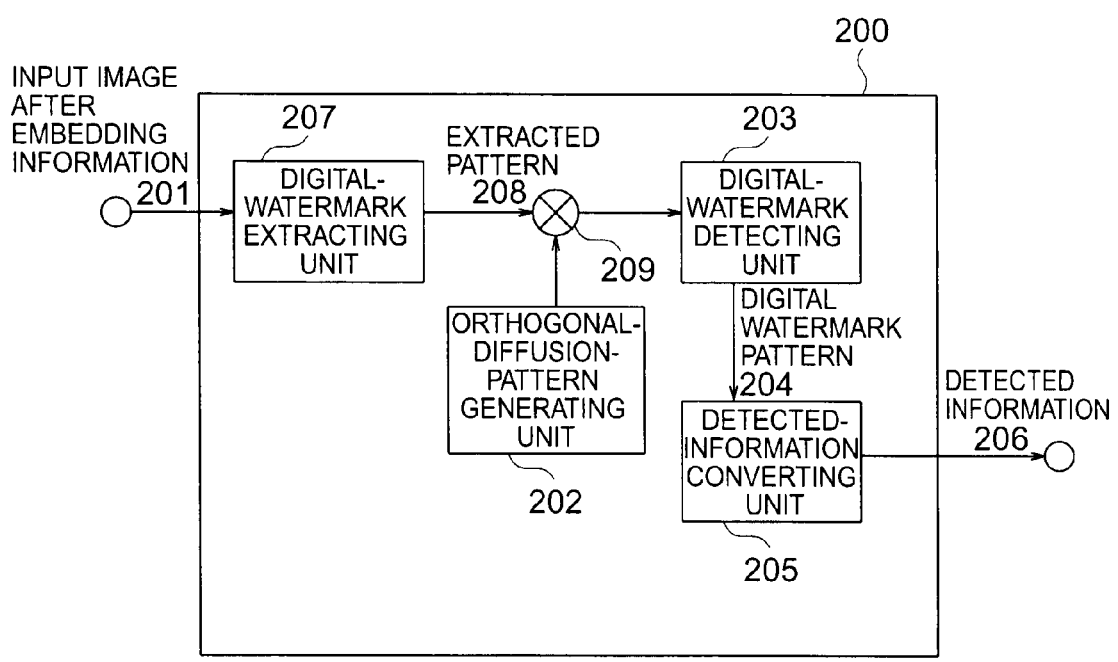
FIG. 2 is a block diagram showing the structure of a digital watermark detecting device according to the first embodiment of the present invention.

Further, FIG. 2 is a block diagram showing the structure of a digital watermark detecting device according to the first embodiment of the present invention.

A digital watermark detecting device 200 according to the first embodiment shown in FIG. 2 includes a digital-watermark extracting unit 207 that extracts a pattern embedded as a digital watermark from an input image after embedding information 201, which is a digital watermark information detection target, and outputs an extracted pattern 208, an orthogonal-diffusion-pattern generating unit 202 that generates a plurality of orthogonal patterns having the length same as that at the time of embedding, an integrating unit 209 that integrates each of the plurality of orthogonal patterns generated by the orthogonal-diffusion-pattern generating unit 202 and the extracted pattern 208 outputted from the digital-watermark extracting unit 207, a digital-watermark detecting unit 203 that calculates detected values by calculating an average of values repeatedly embedded for each bit from a result of the integration of the integrating unit 209, extracts, from the detected values, a detected value which takes a maximum value for each bit, and generates a digital watermark pattern 204, and a detected-information converting unit 205 that converts the digital watermark pattern 204 generated from the digital-watermark detecting unit 203 into bit information, converts a bit string of the bit information into detected information 206 in accordance with rules determined in advance, and outputs the detected information 206.

Next, an operation of the digital watermark embedding device according to the structure described above is explained.

First, the input image 101, which is a digital watermark information embedding target, and the information to be embedded 102 embedded as a digital watermark are inputted to the digital watermark embedding device 100. The embedding-information converting unit 103 converts the information to be embedded 102 into a bit string formed by "0's" and "1's" and outputs the converted bit string as the digital watermark pattern 104.

In this case, in the digital watermark pattern 104, respective bits of the bit string are embedded a plurality of times. For example, when the bit string is "0101" and each of the bits is embedded four times, the digital watermark pattern 104 is "−1,−1,−1,−1, +1,+1,+1,+1, −1,−1,−1,−1, +1,+1,+1,+1". However, the bit "0" is embedded as "−1" in a digital watermark and the bit "1" is embedded as "+1" in the digital watermark.

On the other hand, the orthogonal-pattern generating unit 105 outputs one of patterns orthogonal to one another (orthogonal patterns). The outputted orthogonal pattern is integrated with respective elements of the digital watermark pattern 104 and the embedding pattern 106 is generated. For example, "+1,+1,−1,−1" which is one of orthogonal patterns having the length of 4 is integrated with a digital watermark pattern "−1,−1,−1,−1, +1,+1,+1+1, −1,−1,−1,−1, +1,+1+1, +1", the orthogonal pattern is repeatedly integrated from the beginning. Therefore, the embedding pattern 106 after the integration is "−1,−1,+1,+1, +1,+1,−1,−1, −1,−1,+1,+1, +1,+1,−1,−1".

The digital-watermark embedding unit 107 embeds the embedding pattern 106 in the input image 101 and outputs the image after embedding information 108.

Next, an operation of the digital watermark detecting device according to the structure described above for detecting the digital watermark embedded as described above is explained.

First, the input image after embedding information 201, which is a digital watermark information detection target, is inputted to the digital watermark detecting device 200. The digital-watermark extracting unit 207 extracts a pattern embedded as a digital watermark from the input image after embedding information 201 and outputs the extracted pattern 208.

The orthogonal-diffusion-pattern generating unit 202 generates a plurality of orthogonal patterns having the length same as that at the time of embedding. The integrating unit 209 integrates each of the plurality of generated orthogonal patterns and the extracted pattern 208.

For example, as an example of orthogonal patterns having the length of 4, an orthogonal pattern (1) "+1,+1,+1,+1", an orthogonal pattern (2) "+1,+1,−1,−1", an orthogonal pattern (3) "+1,−1,+1,−1", and an orthogonal pattern (4) "+1,−1,−1,+1" are considered. In this case, when an inner product is calculated for arbitrary two patterns among the orthogonal pattern (1) to the orthogonal pattern (4), a calculation result is 0. As the extracted pattern 208, "−1,−1,+1,+1, +1,+1,−1,−1, −1,−1,+1,+1, +1,+1,−1,−1" same as the embedding pattern 106 after the integration is considered.

In this case, a result of integration of the extracted pattern 208 and the orthogonal pattern (1) (hereinafter, referred to as integration result (1)) is "−1,−1,+1,+1, +1,+1,−1,−1, −1,−1, +1,+1, +1,+1,−1,−1", a result of integration of the extracted pattern 208 and the orthogonal pattern (2) (hereinafter, referred to as integration result (2)) is "−1,−1,−1, +1,+1,+1, +1, −1,−1,−1,−1, +1,+1,+1,+1", a result of integration of the extracted pattern 208 and the orthogonal pattern (3) (hereinafter, referred to as integration result (3)) is "−1,+1,+1,−1, +1,−1,−1,+1, −1,+1,+1,−1, +1,−1,−1,+1", and a result of integration of the extracted pattern 208 and the orthogonal pattern (4) (hereinafter, referred to as integration result (4)) is "−1, +1,−1,+1, +1,−1,+1,−1, −1,+1,−1,+1, +1,−1,+1,−1".

Those integration results (1) to (4) are inputted to the digital-watermark detecting unit 203. First, the digital-watermark detecting unit 203 calculates detected values by calculating an average of values repeatedly embedded for each bit. This is equivalent to calculating a correlation between an extracted pattern and an orthogonal pattern for each bit. In this case, each of the bits is embedded four times, so detected values (1) to (4) obtained from the integration results (1) to (4) are the detected value (1) "0,0,0,0", the detected value (2) "−1,+1,−1,+1", the detected value (3) "0,0,0,0", and the detected value (4) "0,0,0,0", respectively.

Next, concerning the detected values (1) to (4), the digital-watermark detecting unit 203 extracts a detected value which takes a maximum absolute value for each bit and generates the digital watermark pattern 204. In individual examples, a detected value of the detected value (2) is the maximum for all the bits. Therefore, the digital watermark pattern 204 is "−1, +1,−1,+1". The generated digital watermark pattern 204 is inputted to the detected-information converting unit 205.

First, the detected-information converting unit 205 converts the inputted digital watermark pattern 204 into bit information. In this case, the bit "0" is embedded as "−1" and the bit "1" is embedded as "+1". Therefore, the digital watermark pattern 204 "−1,+1,−1,+1" is converted into a bit string "0,1, 0,1".

Next, the bit string is converted into detected information in accordance with rules determined in advance. For example, when the bit string corresponds to the ASCII character code, the detected information is ASCII characters.

With this structure, an absolute value of a correlation is large only when orthogonal patterns applied at the time of detection coincide with those at the time of embedding and is a value close to 0 when the orthogonal patterns applied at the time of detection do not coincide with those at the time of embedding. Therefore, it is possible to expect an effect that information to be embedded can be accurately detected by checking a code of a detected value obtained when an "orthogonal pattern" having a largest absolute value of a correlation is used. Further, it is possible to realize stable digital watermark detection using pixels smaller in number than those in the conventional art. It is also possible to embed and detect a larger digital watermark information amount with an identical number of pixels used for digital watermark embedding in the conventional art.

In the above description, the digital watermark pattern 104 is formed by only "+1's" and "−1's". However, the digital watermark pattern 104 may be formed by "+α's" and "−α's" (α is a positive integer) in order to improve intensity of a digital watermark.

Alternatively, in order to reduce deterioration due to digital watermark embedding, the digital watermark pattern 104 may be formed by an arbitrary integer having a minus sign and an arbitrary integer having a plus sign.

Second Embodiment

In the first embodiment described above, orthogonal patterns are integrated with and embedded in a digital watermark pattern that should be embedded. Next, an embodiment for directly embedding orthogonal patterns will be explained.

Figure 3:
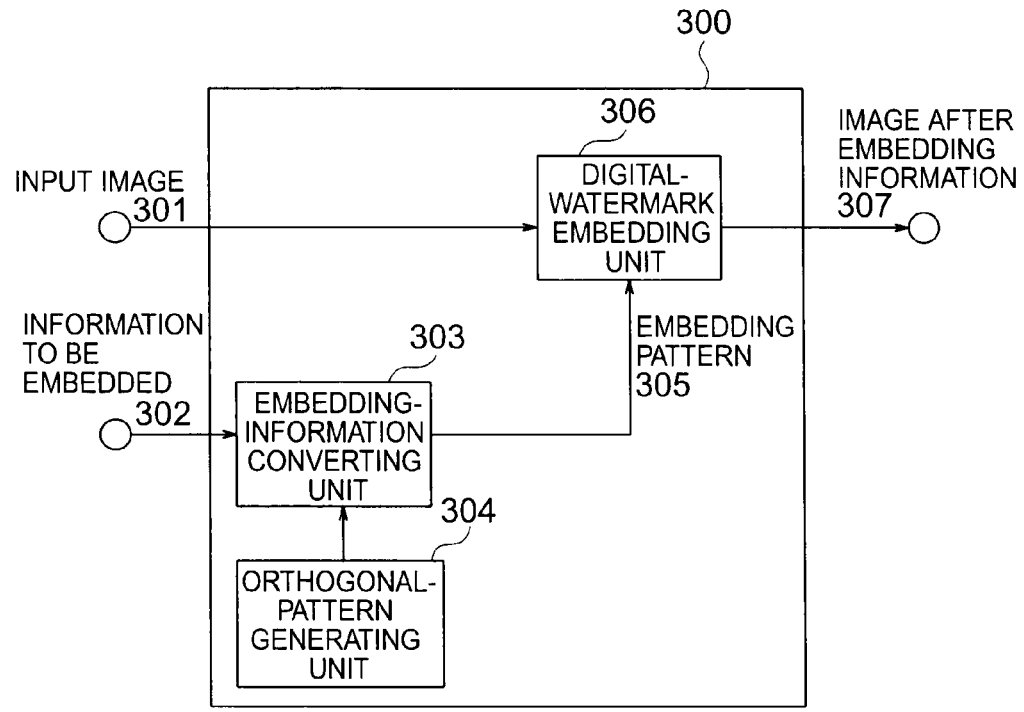
FIG. 3 is a block diagram showing the structure of a digital watermark embedding device according to a second embodiment of the present invention.

FIG. 3 is a block diagram showing the structure of a digital watermark embedding device according to a second embodiment of the present invention.

A digital watermark embedding device 300 according to the second embodiment of the present invention shown in FIG. 3 includes an orthogonal-pattern generating unit 304 that generates orthogonal patterns having a pattern length determined in advance, an embedding-information converting unit 303 that registers the orthogonal patterns generated from the orthogonal-pattern generating unit 304, carries out association of the registered orthogonal patterns and specific bit representations, converts inputted information to be embedded 302 into a bit string formed by "0's" and "1's", converts the bit string for specific bit representation into orthogonal patterns one by one in accordance with the association of the bit representations and the orthogonal patterns, and repeatedly arranges the respective orthogonal patterns a number of times determined in advance to generate an embedding pattern 305, and outputs the embedding pattern 305, and a digital-watermark embedding unit 306 that embeds the embedding pattern 305 from the embedding-information converting unit 303 in an input image 301 as a digital watermark, generates an image after embedding information 307, and outputs the image after embedding information 307.

Figure 4:
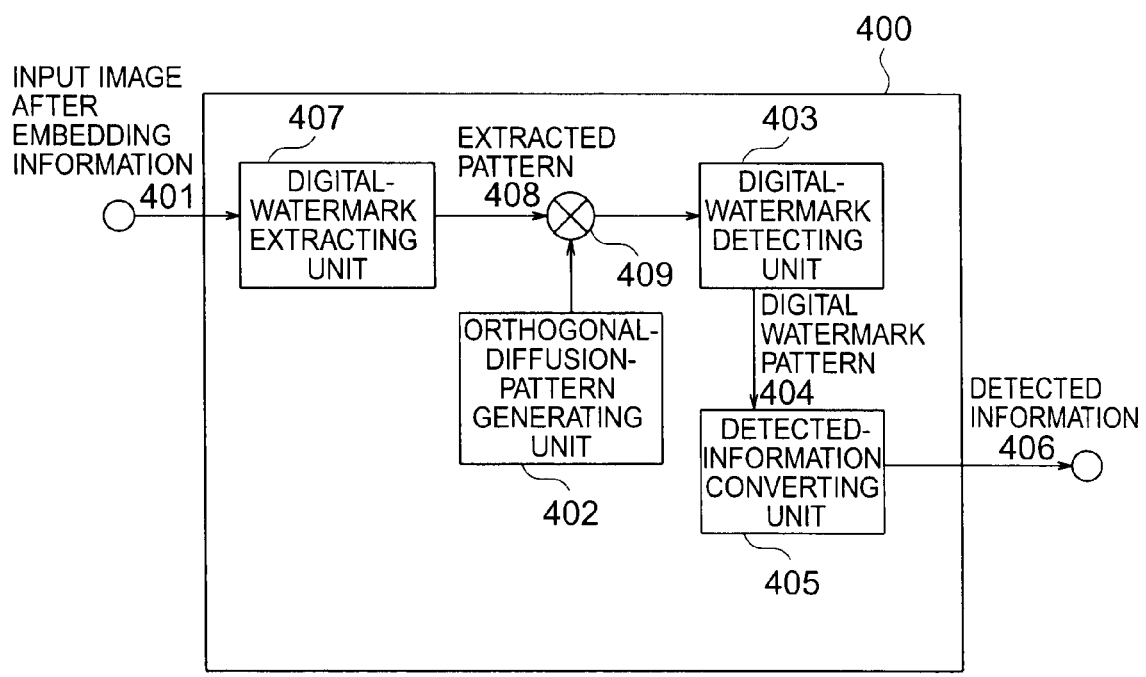
FIG. 4 is a block diagram showing the structure of a digital watermark embedding device according to the second embodiment of the present invention.

FIG. 4 is a block diagram showing the structure of a digital watermark detecting device according to the second embodiment of the present invention.

A digital watermark detecting device 400 according to the second embodiment of the present invention shown in FIG. 4 includes a digital-watermark extracting unit 407 that extracts a pattern embedded as a digital watermark from an input image after embedding information 401, which is a digital watermark information detection target, and outputs an extracted pattern 408, an orthogonal-diffusion-pattern generating unit 402 that generates a plurality of orthogonal patterns having the length same as that at the time of embedding, an integrating unit 409 that integrates each of the plurality of orthogonal patterns generated by the orthogonal-diffusion-pattern generating unit 402 and the extracted pattern 408 outputted from the digital-watermark extracting unit 407, a digital-watermark detecting unit 403 that finds out an orthogonal pattern having a maximum value within a result of the integration of the integrating unit 409 and generates a digital watermark pattern 404 by selecting a bit string associated with the orthogonal pattern, and a detected-information converting unit 405 that converts the digital watermark pattern 404 generated from the digital-watermark detecting unit 403 into bit information, converts a bit string of the bit information into detected information 406 in accordance with rules determined in advance, and outputs the detected information 406.

Next, an operation of the digital watermark embedding device according to the structure described above will be explained.

First, the orthogonal-pattern generating unit 304 generates orthogonal patterns having a pattern length determined in advance and registers the orthogonal patterns in the embedding-information converting unit 303. The information converting unit 303 carries out association of the registered orthogonal patterns and specific bit representations. An example at the time when the pattern length is 4 is shown in FIG. 5.

In FIG. 5, reference numeral 500 denotes a set of orthogonal patterns 501 to 504 and reference numeral 520 denotes a set of orthogonal patterns (with signs inverted) obtained by inverting signs of the orthogonal patterns 501 to 504 on the basis of a characteristic that, even when one vector belonging to one combination of orthogonal vectors is changed to a vector with a sign inverted, the vector is orthogonal to other arbitrary vectors belonging to the combination. Reference numerals 521 to 524 denote orthogonal patterns (with signs inverted) obtained by inverting the signs of the orthogonal patterns 501 to 504, respectively. When arbitrary two patterns are selected from the set 500 of the orthogonal patterns and the set 520 of the orthogonal patterns (with signs inverted), an inner product of the two patterns is 0 (the two patterns are orthogonal to each other).

When the pattern length is 4, the number of patterns orthogonal to one another is 8, so it is possible to associate the patterns with 3-bit representations. Therefore, the 3-bit representations and the patterns orthogonal to one another are associated as shown in FIG. 5. Specifically, bit representations 511 to 514 are associated with the orthogonal patterns 501 to 504, respectively, and bit representations 531 to 534 are associated with the orthogonal patterns (with sings inverted) 521 to 524, respectively. In this case, the bit representations 531 to 534 are set as bit representations obtained by inverting bits of the bit representations 511 to 514, respectively.

Hereinafter, the operation will be explained again.

After the preparation described above, an input image which is an embedding target of digital watermark information, and information to be embedded, which is embedded as a digital watermark, are inputted to the digital watermark embedding device 300.

First, the embedding-information converting unit 303 converts the inputted information to be embedded 302 into a bit string formed by "0's" and "1's". Next, the embedding-information converting unit 303 converts the bit string for each specific bit representation into orthogonal patterns in accordance with the association of the bit representations and the orthogonal patterns. The embedding-information converting unit 303 repeatedly arranges the respective orthogonal patterns a number of times determined in advance, generates and outputs the embedding pattern 305. The number of times of repetition is set according to the number of areas in which a digital watermark can be embedded, a pattern length of the orthogonal patterns, and the like.

An example is described with reference to FIG. 5. For example, it is assumed that the bit string converted by the embedding-information converting unit 303 is "010110" and it is decided to repeat each of identical orthogonal patterns twice. In this case, first, a bit representation "010" is converted into an orthogonal pattern "+1,−1,+1,−1" and a bit representation "110" is converted into an orthogonal pattern "−1,−1,+1,+1". Since it is determined that each of identical orthogonal patterns is repeated twice, a bit string "010110" changes to an embedding pattern "+1,−1,+1,−1, +1,−1,+1,−1, −1,−1,+1,+1, −1,−1,+1,+1".

Hereinafter, the operation will be explained again.

The embedding pattern 305 generated as described above is passed to the digital-watermark embedding unit 306. The digital-watermark embedding unit 306 embeds the embedding pattern 305 in the input image 301 as a digital watermark, generates and outputs the image after embedding information 307.

Next, an operation of the digital watermark detecting device according to the structure described above for detecting the digital watermark embedded as described above will be explained.

First, the input image after embedding information 401, which is a digital watermark information detection target, is inputted to the digital watermark detecting device 400. The digital-watermark extracting unit 407 extracts a pattern embedded as a digital watermark from the input image after embedding information 401 and outputs the extracted pattern 408.

The orthogonal-diffusion-pattern generating unit 402 generates a plurality of orthogonal patterns having the length same as that at the time of embedding. The integrating unit 409 integrates each of the plurality of generated orthogonal patterns and the extracted pattern 408.

In this case, an operation of the orthogonal-diffusion-pattern generating unit 402 will be explained in detail using the orthogonal patterns 501 to 504 and the orthogonal patterns 521 to 524 shown in FIG. 5 as the orthogonal patterns having the length of 4 as at the time of embedding. Further, in this case, "+1,−1,+1,−1,+1,−1,+1,−1,−1,−1,+1,+1,−1,−1,+1,+1" same as the embedding pattern 305 after the integration is considered as the extracted pattern 408. As in the case of the embedding, it is assumed that each of identical orthogonal patterns is decided to be repeated twice.

In this case, results obtained by multiplying the former half portion of the extracted pattern 408 with respective elements of the orthogonal patterns 501 to 504 and the orthogonal patterns 521 to 524 shown in FIG. 5 are "+1,−1,+1,−1, +1, −1,+1,−1" at the time of the orthogonal pattern 501, "+1,−1, −1,+1+1,−1,−1,+1" at the time of the orthogonal pattern 502, "+1,+1,+1,+1+1,+1,+1,+1" at the time of the orthogonal pattern 503, "+1,+1,−1,−1, +1,+1,−1,−1" at the time of the orthogonal pattern 504, "−1,+1,−1,+1 −1,+1,−1,+1" at the time of the orthogonal pattern 521, "−1,+1,+1,−1, −1,+1,+1, −1" at the time of the orthogonal pattern 522, "−1,−1,−1,−1, −1,−1,−1,−1" at the time of the orthogonal pattern 523, and "−1,−1,+1,+1, −1,−1,+1,+1" at the time of the orthogonal pattern 524. Therefore, results of integration of the respective orthogonal patterns are "0" at the time of the orthogonal pattern 501, "0" at the time of the orthogonal pattern 502, "+8" at the time of the orthogonal pattern 503, "0" at the time of the orthogonal pattern 504, "0" at the time of the orthogonal pattern 521, "0" at the time of the orthogonal pattern 522, "−8" at the time of the orthogonal pattern 523, and "0" at the time of the orthogonal pattern 524.

When a latter half portion of the extracted pattern 408 is calculated in the same manner, results of integration of the latter half portion of the extracted pattern 408 with the respective orthogonal patterns 501 to 504 and orthogonal patterns 521 to 524 are "0" at the time of the orthogonal pattern 501, "−8" at the time of the orthogonal pattern 502, "0" at the time of the orthogonal pattern 503, "0" at the time of the orthogonal pattern 504, "0" at the time of the orthogonal pattern 521, "+8" at the time of the orthogonal pattern 522, "0" at the time of the orthogonal pattern 523, and "0" at the time of the orthogonal pattern 524.

Next, the digital-watermark detecting unit 403 finds out an orthogonal pattern having a maximum value within the respective results of the integration of the extracted pattern 408 and the orthogonal patterns 501 to 504 and the orthogonal patterns 521 to 524 shown in FIG. 5 and generates the digital watermark pattern 404 by selecting a bit string associated with the orthogonal pattern.

Specifically, in the respective results of the integration of the former half portion of the extracted pattern 408 and the orthogonal patterns 501 to 504 and the orthogonal patterns 521 to 524 shown in FIG. 5, the result takes a maximum value "+8" at the time of the orthogonal pattern 503. Therefore, the orthogonal pattern 503 is converted into "010", which is the bit representation 513 associated with the orthogonal pattern 503.

Similarly, in the respective results of the integration of the latter half portion of the extracted pattern 408 and the orthogonal patterns 501 to 504 and the orthogonal patterns 521 to 524 shown in FIG. 5, the result takes a maximum value "+8" at the time of the orthogonal pattern 522. Therefore, the orthogonal pattern 522 is converted into "110", which is the bit representation 532 associated with the orthogonal pattern 522.

Since the orthogonal patterns are converted into the bit representations, the digital watermark pattern 404 is "010 110". This coincides with a bit string at the time of embedding.

In the above description, the digital-watermark detecting unit 403 finds out an orthogonal pattern having a maximum value within the respective results of the integration of the extracted pattern 408 and the orthogonal patterns 501 to 504 and the orthogonal patterns 521 to 524 shown in FIG. 5 and generates the digital watermark pattern 404 by selecting a bit string associated with the orthogonal pattern. However, in order to improve calculation efficiency, the digital-watermark detecting unit 403 may find out an orthogonal pattern whose absolute value has a maximum value, within the respective results of the integration of the extracted pattern 408 and the orthogonal patterns 501 to 504 shown in FIG. 5, select a bit string associated with the orthogonal pattern, and, when an integration result of the orthogonal pattern is negative, invert respective bits of the selected bit string. Alternatively, in order to improve calculation efficiency, the digital-watermark detecting unit 403 may find out an orthogonal pattern whose absolute value has a maximum value, within the respective results of the integration of the extracted pattern 408 and the orthogonal patterns 521 to 524 shown in FIG. 5, select a bit string associated with the orthogonal pattern, and, when an integration result of the orthogonal pattern is negative, invert respective bits of the selected bit string.

Lastly, in the detected-information converting unit 405, the bit string is converted into determined information in accordance with rules decided in advance. For example, when the bit string corresponds to the ASCII character code, the detected information is ASCII characters.

With this structure, an absolute value of a correlation is large only when orthogonal patterns applied at the time of detection coincide with those at the time of embedding and is a value close to 0 when the orthogonal patterns applied at the time of detection do not coincide with those at the time of embedding. Therefore, it is possible to expect an effect that information to be embedded can be accurately detected by extracting an "orthogonal pattern" having a largest absolute value of a correlation and selecting a bit string associated with the orthogonal pattern. Further, it is possible to realize stable digital watermark detection using pixels smaller in number than those of the conventional art. It is also possible to embed and detect a larger digital watermark information amount with an identical number of pixels used for digital watermark embedding of the conventional art.

In the above description, the orthogonal patterns 501 to 504 and the orthogonal patterns 521 to 524 are formed by only "+1's" and "−1's", but may be formed by "+α's" and "−α's" (α is a positive integer) in order to improve intensity of a digital watermark.

Alternatively, in order to reduce deterioration due to digital watermark embedding, the orthogonal patterns 501 to 504 and the orthogonal patterns 521 to 524 may be formed by an arbitrary integer having a minus sign and an arbitrary integer having a plus sign.

Third Embodiment

The first and second embodiments described above are embodiments for making it possible to accurately detect information to be embedded. Also, the first and second embodiments are embodiments for making it possible to realize stable digital watermark detection using pixels smaller in number than those of the conventional art. Moreover, the first and second embodiments are embodiments for making it possible to embed and detect a larger digital watermark information amount with an identical number of pixels used for digital watermark embedding in the conventional art.

In a third embodiment of the present invention, an embodiment for making it possible to judge the number of bits of an embedded digital watermark at the time of detection of the watermark will be explained.

In this case, the embodiment is explained assuming that information is embedded with any one of the four kinds of numbers of bits, i.e., 8 bits, 16 bits, 32 bits, and 64 bits.

FIG. 6 is a diagram for explaining judgment of the number of embedded bits according to the third embodiment of the present invention. In FIG. 6, reference numeral 600 denotes one of embedded blocks in which digital watermark embedded places in sixty-four places selected from an embedding target image are arranged in order in accordance with rules determined in advance. For example, when embedded blocks in sixty-four places are selected from the embedding target image at random, the blocks may be given numbers 0 to 63 in order of the selection and arranged in order of the numbers.

In this case, even when information is embedded with any one of the number of bits of 8 bits, 16 bits, 32 bits, and 64 bits, the number of bits of an embedded digital watermark is judged at the time of detection of the digital watermark by embedding a digital watermark for making it possible to judge the number of bits in blocks in which identical bit information is embedded.

Specifically, in embedding n bits from a 0th bit to an (n−1)th bit (in this case, n=8, 16, 32, and 64), when an ith bit is embedded, the ith bit may be embedded in blocks that have the remainder i when numbers of the respective blocks in FIG. 6 are divided by n.

FIG. 7 is a diagram showing embedded blocks of a seventh bit at the time when 8 bits are embedded. At the time of embedding 8 bits, when the seventh bit is embedded, blocks that have the remainder 7 when sixty-four block numbers are divided by 8 are selected and a digital watermark for making it possible to judge the number of bits may be embedded in the blocks. Specifically, as shown in FIG. 7, the digital watermark is embedded in blocks having block numbers 7, 15, 23, 31, 39, 47, 55, and 63.

Similarly, FIG. 8 is a diagram showing embedded blocks of a seventh bit at the time when 16 bits are embedded. At the time of embedding 16 bits, when the seventh bit is embedded, blocks that have the remainder 7 when sixty-four block numbers are divided by 16 are selected and a digital watermark for making it possible to judge the number of bits may be embedded in the blocks. Specifically, as shown in FIG. 8, the digital watermark is embedded in blocks having block numbers 7, 23, 39, and 55.

Similarly, FIG. 9 is a diagram showing embedded blocks of a seventh bit at the time when 32 bits are embedded. At the time of embedding 32 bits, when the seventh bit is embedded, blocks that have the remainder 7 when sixty-four block numbers are divided by 32 are selected and a digital watermark for making it possible to judge the number of bits may be embedded in the blocks. Specifically, as shown in FIG. 9, the digital watermark is embedded in blocks having block numbers 7 and 39.

Similarly, FIG. 10 is a diagram showing embedded blocks of a seventh bit at the time when 64 bits are embedded. At the time of embedding 64 bits, when the seventh bit is embedded, blocks that have the remainder 7 when sixty-four block numbers are divided by 64 are selected and a digital watermark for making it possible to judge the number of bits may be embedded in the blocks. Specifically, as shown in FIG. 10, the digital watermark is embedded in blocks having block number 7.

Next, a digital watermark pattern to be embedded will be explained.

FIG. 11 is a digital watermark pattern for making it possible to judge the number of bits of an embedded digital watermark at the time of detection of the digital watermark.

In FIG. 11, reference numeral 1100 denotes a set of orthogonal patterns 1101 to 1104 and reference numeral 1120 denotes a set of orthogonal patterns (with signs inverted) obtained by inverting signs of the orthogonal patterns 1101 to 1104 on the basis of a characteristic that, even when one vector belonging to one combination of orthogonal vectors is changed to a vector with a sign inverted, the vector is orthogonal to other arbitrary vectors belonging to the combination. Reference numerals 521 to 524 denote orthogonal patterns (with signs inverted) obtained by inverting the signs of the orthogonal patterns 1101 to 1104, respectively. When arbitrary two patterns are selected from the set 1100 of the orthogonal patterns and the set 1120 of the orthogonal patterns (with signs inverted), an inner product of the two patterns is 0 (the two patterns are orthogonal to each other).

Reference numeral 1110 denotes a set of bit representations corresponding to the orthogonal patterns 1101 to 1104, respectively, and reference numeral 1130 denotes a set of bit representations corresponding to the orthogonal patterns 1121 to 1124, respectively. Reference numeral 1111 denotes a bit representation corresponding to the orthogonal pattern 1101 and represents a bit "1" at the time of embedding 8 bits. Reference numeral 1112 denotes a bit representation corresponding to the orthogonal pattern 1102 and represents a bit "1" at the time of embedding 16 bits. Reference numeral 1113 denotes a bit representation corresponding to the orthogonal pattern 1103 and represents a bit "1" at the time of embedding 32 bits. Reference numeral 1114 denotes a bit representation corresponding to the orthogonal pattern 1104 and represents a bit "1" at the time of embedding 8 bits. Reference numeral 1131 denotes a bit representation corresponding to the orthogonal pattern 1121 and represents a bit "0" at the time of embedding 8 bits. Reference numeral 1132 denotes a bit representation corresponding to the orthogonal pattern 1122 and represents a bit "0" at the time of embedding of 16 bits. Reference numeral 1133 denotes a bit representation corresponding to the orthogonal pattern 1123 and represents a bit "0" at the time of embedding of 32 bits. Reference numeral 1134 denotes a bit representation corresponding to the orthogonal pattern 1124 and represents a bit "0" at the time of embedding 64 bits.

Figure 12:
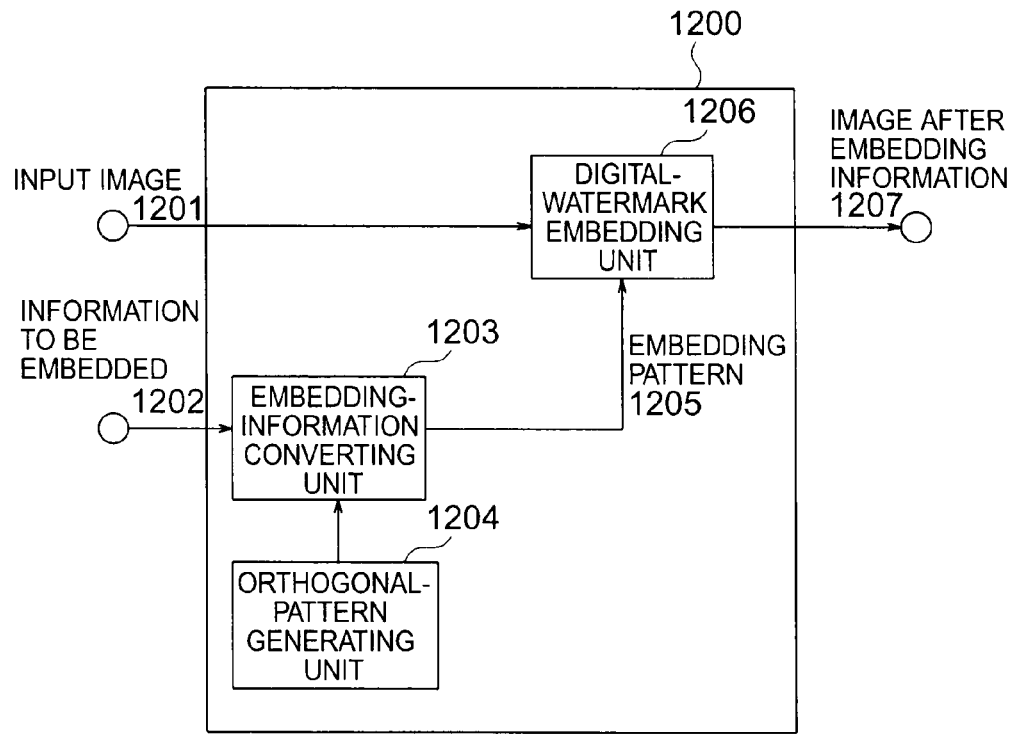
FIG. 12 is a block diagram showing the structure of a digital watermark embedding device according to the third embodiment of the present invention.

FIG. 12 is a block diagram showing the structure of a digital watermark embedding device according to the third embodiment of the present invention.

A digital watermark embedding device 1200 according to the third embodiment of the present invention shown in FIG. 12 includes an orthogonal-pattern generating unit 1204 that generates orthogonal patterns formed by a combination of elements of −1's and +1's and orthogonal to one another, an embedding-information converting unit 1203 that converts an inputted information to be embedded 1202 into a bit string formed by "0's" and "1's", replaces the bit string using the orthogonal patterns generated from the orthogonal-pattern generating unit 1204, and generates an embedding pattern 1205, and a digital-watermark embedding unit 1206 that embeds the embedding pattern 1205 generated from the embedding-pattern generating unit 1204 in an input image 1201 and outputs an image after embedding information 1207.

Figure 13:
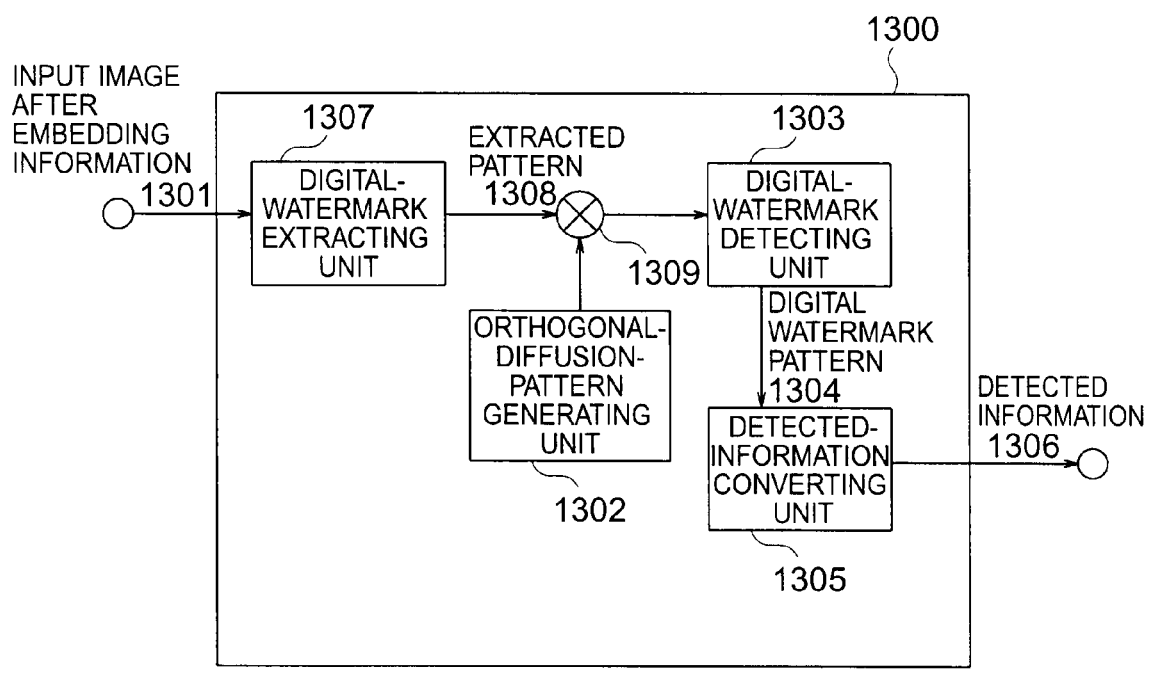
FIG. 13 is a block diagram showing the structure of a digital watermark detecting device according to the third embodiment of the present invention.

FIG. 13 is a block diagram showing the structure of a digital watermark detecting device according to the third embodiment of the present invention.

A digital watermark detecting device 1300 according to the third embodiment of the present invention shown in FIG. 13 includes a digital-watermark extracting unit 1307 that extracts a pattern embedded as a digital watermark from an input image after embedding information 1301, which is a digital watermark information detection target, and outputs an extracted pattern 1308, an orthogonal-diffusion-pattern generating unit 1302 that generates a plurality of orthogonal patterns having the length same as that at the time of embedding, an integrating unit 1309 that integrates each of the plurality of orthogonal patterns generated by the orthogonal-diffusion-pattern generating unit 1302 and the extracted pattern 1308 outputted from the digital-watermark extracting unit 1307, a digital-watermark detecting unit 1303 that finds out an orthogonal pattern having a maximum value within a result of the integration of the integrating unit 1309 and generates a digital watermark pattern 1304 by selecting a bit string associated with the orthogonal pattern, and a detected-information converting unit 1305 that converts the digital watermark pattern 1304 generated from the digital-watermark detecting unit 1303 into bit information, converts a bit string of the bit information into detected information 1306 in accordance with rules determined in advance, and outputs the detected information 1306.

Next, an operation of the digital watermark embedding device according to the structure described above will be explained.

The input image 1201, which is a digital watermark information embedding target, and the information to be embedded 1202 embedded as a digital watermark are inputted to the digital watermark embedding device 1200.

First, the embedding-information converting unit 1203 converts the inputted information to be embedded 1202 into a bit string formed by "0's" and "1's". Next, the embedding-information converting unit 1203 determines, according to the number of bits of the information to be embedded, which of the orthogonal patterns 1101 to 1104 or 1121 to 1124 shown in FIG. 11 is used.

For example, when the number of bits of information to be embedded is 8, first, the embedding-information converting unit 1203 selects the orthogonal pattern 1101 as an orthogonal pattern for embedding bit information "1" and selects the orthogonal pattern 1121 as an orthogonal pattern for embedding bit information "0".

A case in which the information converting unit 1203 converts the information to be embedded 1202 into a bit string and, as a result, a bit string "0101 0011" of 8 bits is obtained is explained as an example.

Since a bit length is 8 bits, the information converting unit 1203 selects the orthogonal pattern 1101, i.e., "+1,+1,+1,+1", as an orthogonal pattern for embedding the bit information "1" and selects the orthogonal pattern 1121, i.e., "−1,−1,−1,−1", as an orthogonal pattern for embedding the bit information "0".

Next, the embedding-information converting unit 1203 replaces the bit string "0101 0011" of 8 bits with the orthogonal pattern 1101 and the orthogonal pattern 1121 and generates the embedding pattern 1205. Specifically, the embedding pattern is "−1,−1,−1,−1, +1+1+1+1, −1−1−1−1, +1,+1,+1,+1, −1,−1,−1,−1, −1,−1,−1,−1, +1,+1,+1,+1, +1,+1,+1,+1". The generated embedding pattern 1205 is passed to the digital-watermark embedding unit 1206.

The digital-watermark-embedding unit 1206 embeds the embedding pattern 1205 in the input image 1201 and outputs the image after embedding information 1207.

Next, an operation of the digital watermark detecting device according to the structure described above for detecting the digital watermark embedded as described above will be explained.

First, the input image after embedding information 1301, which is a digital watermark information detection target, is inputted to the digital watermark detecting device 1300. The digital-watermark extracting unit 1307 extracts a pattern embedded as a digital watermark from the input image after embedding information 1301 and outputs the extracted pattern 1308.

The orthogonal-diffusion-pattern generating unit 1302 generates a plurality of orthogonal patterns having the length same as that at the time of embedding. The integrating unit 1309 integrates each of the plurality of generated orthogonal patterns and a block of an embedding position of a seventh bit at the time of embedding 64 bits extracted from the extracted pattern 1308.

A case in which there are blocks of embedding positions of the seventh bit in eight places at the time of embedding 64 bits extracted from the extracted pattern 1308, a digital watermark pattern extracted from the blocks of the embedding positions of the seventh bit at that point is "1,+1,+1,+1, +1,+1,+1,+1", and generated orthogonal patterns are orthogonal patterns 1101 to 1104 is explained.

Results obtained by repeatedly multiplying respective elements of this digital watermark pattern and the orthogonal patterns 1101 to 1104 are "+1,+1,+1,+1, +1,+1,+1,+1" at the time of the orthogonal pattern 1101, "+1,+1,−1,−1, +1,+1, −1,−1" at the time of the orthogonal pattern 1002, "+1,−1, +1,−1, +1,−1,+1,−1" at the time of the orthogonal pattern 1003, and "+1,−1,−1,+1" at the time of the orthogonal pattern 1004. Therefore, the digital-watermark detecting unit 1303 calculates an integrated value from the respective results. Results of the calculation of the integrated value are "+8" at the time of the orthogonal pattern 1001, "0" at the time of the orthogonal pattern 1002, "0" at the time of the orthogonal pattern 1003, and "0" at the time of the orthogonal pattern 1004.

Therefore, an absolute value of the integration result is a maximum value when the orthogonal pattern 1001 is used, so it is seen that a digital watermark having a bit length of 8 is embedded in the input image 1301 after information embedding. Thus, the digital-watermark detecting unit 1303 carries out detection of a digital watermark on the assumption that 8 bits are embedded, generates the digital watermark pattern 1304 having a 8-bit length embedded as a digital watermark, and passes the digital watermark pattern 1304 to the detected-information converting unit 1305.

The detected-information converting unit 1305 converts the digital watermark pattern 1304 formed by "0's" and "1's" into detected information in accordance with rules determined in advance. For example, when a bit string corresponds to the ASCII character code, the detected information is ASCII characters.

With this structure, an absolute value of a correlation is large only when orthogonal patterns applied at the time of detection coincide with those at the time of embedding and is a value close to 0 when the orthogonal patterns applied at the time of detection do not coincide with those at the time of embedding. Therefore, it is possible to expect an effect that the number of bits of a digital watermark can be judged by checking a code of a detected value obtained when an "orthogonal pattern" having a largest absolute value of a correlation is used.

In the above description, the orthogonal patterns 1101 to 1104 and the orthogonal patterns 1121 to 1124 are formed by only "+1's" and "−1's". However, the orthogonal patterns 1101 to 1104 and the orthogonal patterns 1121 to 1124 may be formed by "+α's" and "−α's" (α is a positive integer) in order to improve intensity of a digital watermark.

Alternatively, in order to reduce deterioration due to digital watermark embedding, the orthogonal patterns 1101 to 1104 and the orthogonal patterns 1121 to 1124 may be formed by an arbitrary integer having a minus sign and an arbitrary integer having a plus sign.

The invention claimed is:

1. A digital watermark embedding device, comprising:
an orthogonal-pattern generating unit configured to generate orthogonal patterns each formed of a combination of elements of −1's and +1's and orthogonal to one another;
an embedding-information converting unit configured to convert inputted information to be embedded into a bit string formed of "0's" and "1's", replace each bit of the bit string with one pattern of the orthogonal patterns, the one pattern being determined by a length of the bit string and a value of the bit, to generate an embedding pattern; and
a digital-watermark embedding unit configured to embed the embedding pattern from the embedding-information converting unit in an input image and output an image after embedding,
wherein the embedding-information converting unit determines which of the orthogonal patterns is used according to the number of bits of the information to be embedded.

2. A digital watermark detecting device, comprising:
a digital-watermark extracting unit configured to extract a pattern embedded as a digital watermark from an input image after embedding information, which is a digital watermark information detection target;
an orthogonal-diffusion-pattern generating unit configured to generate a plurality of orthogonal patterns having a same length as that at the time of embedding;
an integrating unit configured to integrate each of the plurality of orthogonal patterns generated by the orthogonal-diffusion-pattern generating unit and the extracted pattern from the digital-watermark extracting unit;
a digital-watermark detecting unit configured to determine an orthogonal pattern having a maximum value in a result of an integration of the integrating unit to determine a corresponding number of bits embedded, and generate a digital watermark pattern, based on the determined number of bits embedded, by selecting a bit string pre-associated with the orthogonal pattern; and
a detected-information converting unit configured to convert the digital watermark pattern from the digital-watermark detecting unit into bit information, convert a bit string of the bit information into detected information in accordance with rules set in advance, and output the detected information,
wherein the digital-watermark detecting unit judges that a digital watermark having the corresponding number of bits is embedded, carries out detection of the digital watermark, and generates the digital watermark pattern as the digital watermark.

* * * * *